United States Patent
Tar et al.

(10) Patent No.: US 6,681,903 B2
(45) Date of Patent: Jan. 27, 2004

(54) WHEEL HUB FOR VEHICLES

(75) Inventors: Lóránt Tar, Győr (HU); Andor Opitz, Győr (HU); Tibor Végh, Győr (HU)

(73) Assignee: Raba-Futomu Gyarto es Kereskedelmi Kft., Gyor (HU)

( * ) Notice: Subject to any disclaimer, the term of this patent is extended or adjusted under 35 U.S.C. 154(b) by 265 days.

(21) Appl. No.: 09/799,734

(22) Filed: Mar. 7, 2001

(65) Prior Publication Data

US 2001/0025749 A1 Oct. 4, 2001

(30) Foreign Application Priority Data

Mar. 8, 2000 (HU) .............................................. 0001056

(51) Int. Cl.$^7$ ........................... F16D 55/22; F16D 65/24
(52) U.S. Cl. ...................... 188/72.3; 188/73.1; 188/170
(58) Field of Search ............................. 188/71.5, 71.6, 188/71.1, 17, 18 R, 170, 72.3, 72.4, 72.5, 73.1, 73.31; 475/29, 30, 31

(56) References Cited

U.S. PATENT DOCUMENTS

| | | | | |
|---|---|---|---|---|
| 4,004,670 A | * | 1/1977 | Nerstad et al. | 192/105 A |
| 4,134,478 A | * | 1/1979 | Balzer | 188/106 P |
| 4,540,073 A | * | 9/1985 | Rogier | 192/221.1 |
| 4,560,034 A | * | 12/1985 | Windish et al. | 188/72.3 |
| 4,576,256 A | | 3/1986 | Rogier | |
| 4,607,730 A | * | 8/1986 | Paisley | 188/170 |
| 4,947,966 A | * | 8/1990 | Huff | 188/170 |
| 5,050,710 A | * | 9/1991 | Bargfrede | 188/71.6 |
| 5,088,967 A | * | 2/1992 | Opitz et al. | 475/107 |
| 5,601,160 A | * | 2/1997 | Horsch | 188/71.5 |
| 5,601,162 A | * | 2/1997 | Heimann | 188/170 |
| 6,089,357 A | * | 7/2000 | Jackson et al. | 188/71.6 |
| 6,189,669 B1 | * | 2/2001 | Kremer et al. | 192/70.12 |

FOREIGN PATENT DOCUMENTS

| | | |
|---|---|---|
| DE | 32 43 117 A1 | 6/1983 |
| FR | 2 519 091 | 7/1983 |

* cited by examiner

*Primary Examiner*—Jack Lavinder
*Assistant Examiner*—Melody M. Burch
(74) *Attorney, Agent, or Firm*—Young & Thompson

(57) ABSTRACT

A wheel hub for vehicles has a built-in brake assembly for stopping and parking the vehicle. A parking piston and a spring assembly of the parking brake are arranged within the ring gear support member, and impact on the brake piston of the multi-plate friction type wet brake, and the ring gear support member. The parking brake has a device for manually de-activating the parking brake from outside the hub. The device includes a screw that overrides spring pressure to move the parking piston away from the brake piston to manually release the parking brake.

9 Claims, 4 Drawing Sheets

WHEEL HUB FOR VEHICLES

BACKGROUND OF THE INVENTION

1. Field of the Invention

The invention relates to a wheel hub for vehicles having a built-in brake assembly for stopping and parking the vehicle. For this, the wheel hub comprises a hollow axle casing fixed to a vehicle frame, a hollow axle housing rotatably mounted on the axle casing and carrying a vehicle wheel rim, a planetary gearing and a multi-plate friction type wet brake both being coupled to a drive shaft driven by a wheel hub of the vehicle, wherein the multi-plate friction type wet brake having inner brake plates, outer brake plates and a brake piston displaceable in axial direction is arranged in its entirety within a ring gear support member splined on the periphery of said axle casing without rotation, and the brake for parking the vehicle has a piston and a spring assembly.

2. Description of the Related Art

U.S. Pat. No. 5,088,967 describes a driven axle assembly of heavy duty vehicles such as muckshifters, mining machines, agricultural power machines and vehicles for handling and transporting materials, which has a planetary gearing and a multi-plate friction type wet brake. This solution is able to cope with the high loads and stresses applied on driven axle assemblies of vehicles as mentioned above, but it is lacking of a parking brake serving to leave the wheels of the vehicle in braked position when it is out of operation as well as to provide safety brake action when the normal operational brake has malfunction.

It is not unusual to provide an auxiliary parking brake assembly for wheel hubs of the driven axle assemblies of this type, i.e. wherein a multi-plate friction type wet brake is arranged for the purpose of the operational braking system of the vehicle. French Patent Application No. 2 519 091 has a parking brake with a piston and a spring assembly, wherein the springs are formed as cup springs arranged longitudinally in "series" with the operational brake. Therefore, the wheel hub has enlarged constructional length. Further, the brake plates of the wet operational brake are connected without any gearing directly onto the wheel hub, thus, the braking force in relation to the force applied onto the brake piston is extremely low. As a result, enlarged number of brake plates and brake piston pressure are necessary and the reaction forces within the hub result in enlarged loads on the gears and bearings.

The arrangement of operational brake and parking brake is quite similar in German Patent Specification No. DE 32 43 117, however, the two brakes are at the two extremities of the wheel hub. Therefore, complicated mechanism is necessary to lead the braking action from the parking brake to the brake plates of the multi-plate friction type wet brake. Quite unusually, both the outer brake plates and the inner brake plates are revolving and the braking action is resulting from the difference between the two rotational speeds. Therefore, the braking efficiency of this solution is quite low.

In the solution as shown in U.S. Pat. No. 4,576,256, the outer diameter of the whole wheel hub is considerably enlarged to be able to arrange the cup spring bundle and the hydraulic piston of the parking brake within the axle casing. Since the axle housing is rotatable against the axle casing, the bearing between them must have unusually large diameters. To reduce the length of the hub, the bearings are in near vicinity to each other, all these reducing the stability and the stiffness of the assembly. The constructional parts to lead the braking force of the parking brake from within the axle casing to the brake plates are quite complicated and ineffective because of the diametrical differences between the two brake assemblies.

Further to these disadvantages, it is characteristic for all known solutions that they are not equipped with means for manually de-activating the parking brake if the vehicle is out of function because of any reason. If the engine or the hydraulic system of the vehicle are brought to standstill or have any malfunction, the vehicle cannot be moved on its wheels since the braking action of the parking brake cannot be eliminated from outside the hub. Since the wheel hubs with driving gearing, multi-plate friction type wet brake and parking brake in the inside are most commonly used with heavy duty vehicles, the need to overcome this disadvantage is quite urgent.

SUMMARY OF THE INVENTION

The main objective of the present invention is to provide a wheel hub for the driven axle of vehicles wherein the advantages of the well proved axle assemblies with driving gearing and multi-plate friction type wet brake in the inside can be preserved when combined with a parking brake in the wheel hub without increase of complexity, production and operation costs and decrease of duration, load bearing capacity and reliability. At the same time, the wheel hub shall be suited for de-activating the parking brake when the vehicle is out of operation.

The basic idea of this invention is to integrate the parking brake into the operational brake of the wheel hub and to provide access to the activating unit of the parking brake from the outside of the wheel hub.

Hence, according to the invention, a wheel hub for vehicles having a built-in brake assembly for stopping and parking the vehicle comprises a hollow axle casing fixed to a vehicle frame, a hollow axle housing rotatably mounted on the axle casing and carrying a vehicle wheel rim, a planetary gearing and a multi-plate friction type wet brake both being coupled to a drive shaft driven by a driving unit of the vehicle, wherein the multi-plate friction type wet brake having inner brake plates, outer brake plates and a brake piston displaceable in axial direction is arranged in its entirety within a ring gear support member splined on the periphery of said axle casing without rotation, and the brake for parking the vehicle has a piston and a spring assembly.

The improvement is in that the piston and the spring assembly of the brake for parking the vehicle are arranged within the ring gear support member, they impact on the brake piston of the multi-plate friction type wet brake, on one hand, and on the ring gear support member, on the other, and the brake for parking the vehicle has means for manually de-activating said parking brake from outside the hub.

Various optional or preferred features are set out in the detailed description forming part of this specification.

Thus, in one exemplified embodiment of this invention, the piston of the parking brake is formed as an annular piston moveably arranged on the outer periphery of a disk holding the ring gear support member against the axle casing and fixed to the axle casing. Therein, it may be preferred, that a pressure chamber is formed between the piston and the disk, and the piston has a radially inwardly extending flange sealed against the disk and the disk has a radially outwardly extending flange sealed against the piston.

It is also preferred, according to the invention, that the spring assembly of the parking brake has a series of helical springs arranged parallelly to each other and the driving shaft on a diameter exceeding the inner diameter of the piston of the parking brake. In this case, the piston may have an annular groove serving as spring cup receiving the springs of the spring assembly of the parking brake and lying with its outer surface against the brake piston.

A further preferred embodiment is wherein the spring assembly of the parking brake has at least one annular cup spring lying against the brake piston and/or said piston of said parking brake, on one hand, and the support member, on the other.

It is still another preferred embodiment, wherein the means for manually de-activating said parking brake has means to urge the piston of the parking brake against the ring gear support member.

Most preferably, at least one through-bore passing through an outer cover of the hub, a planetary carrier of the planetary gearing, the inner brake plates and the piston as well as at least one screw in threaded connection with the support member coaxially with the through-bore are provided, and a head of each screw lies against a flange of the piston to move the piston towards the support member when the screw is screwed into the support member, and each through-bore is blanked by a screw in the outer cover, respectively.

BRIEF DESCRIPTION OF THE DRAWINGS

Embodiments of this invention will now be described by way of example with reference to the accompanying drawings, in which.

DETAILED DESCRIPTION OF THE PREFERRED EMBODIMENTS

Figure 2:
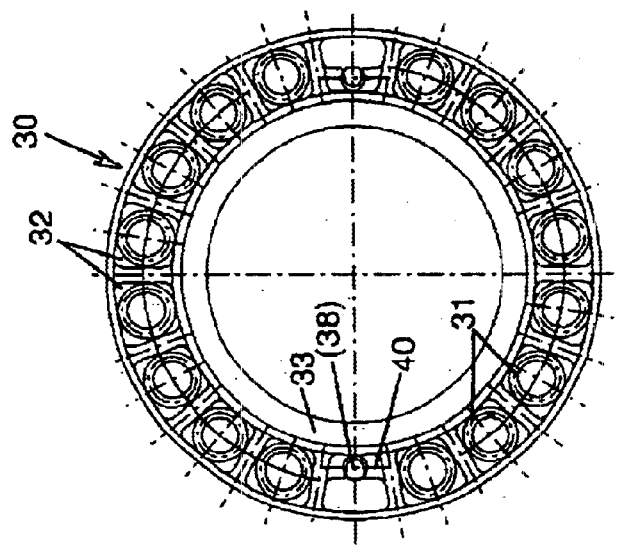
FIG. 2 is a side elevational view of a part of the embodiment as in FIG. 1: the helical springs and the piston of the parking brake.

U.S. Pat. No. 5,088,967 describes a driven axle assembly of heavy duty vehicles with planetary gearing and a multi-plate friction type wet brake. This description serves as a basis for this discussion of preferred embodiments in this invention. In the drawings, a wheel hub unit and the portions adjoined to it are shown; the same assembly is on the other end of the driven axle of the vehicle.

Figure 1:
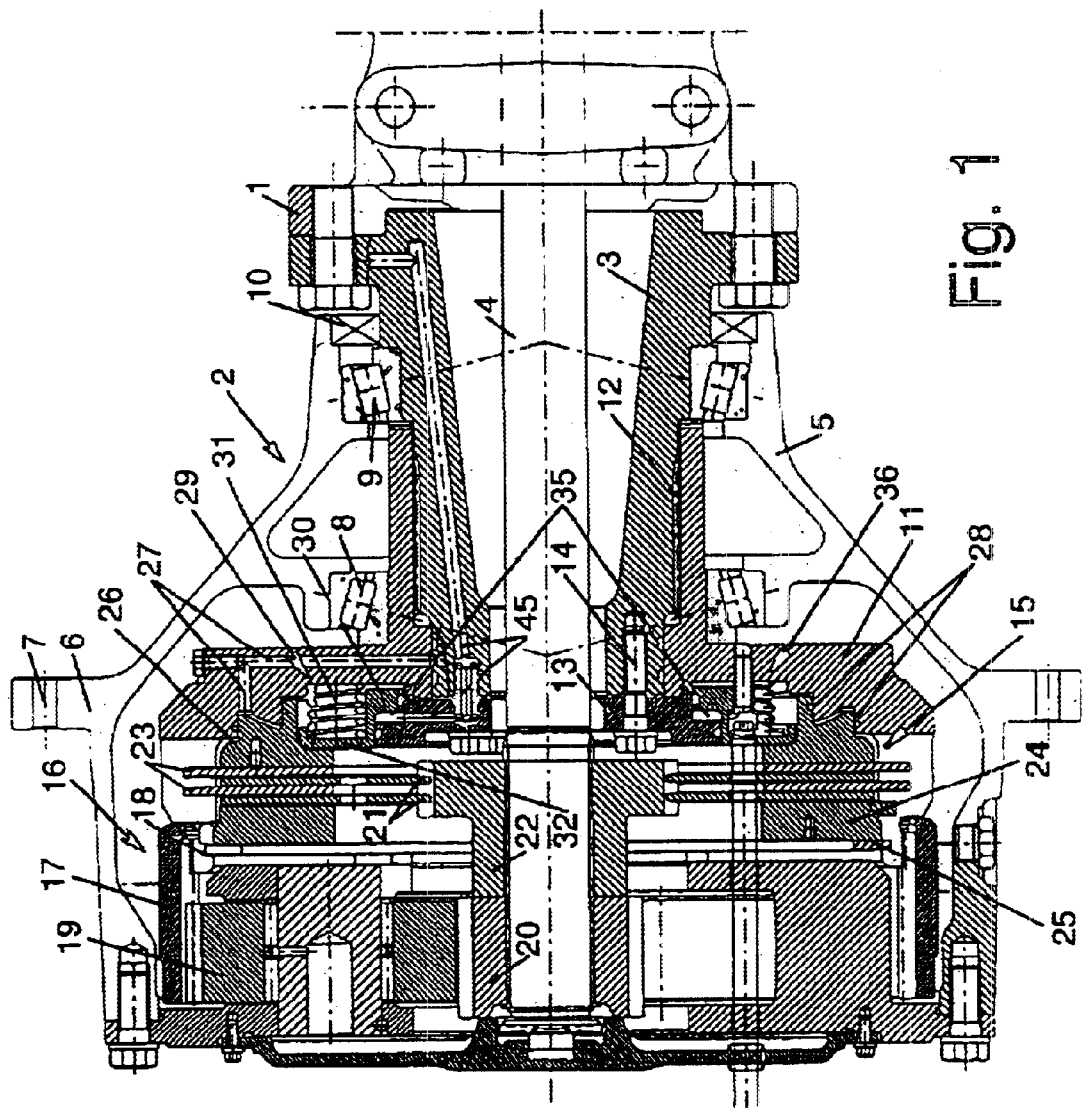
FIG. 1 illustrates a preferred embodiment of the wheel hub as in this invention in cross sectional view.

FIG. 1 shows a wheel hub 2 providing the rotational movement for moving the vehicle and being coupled to an axle casing 1 of the vehicle. To the axle casing 1, a hollow spindle 3 is stationarily fixed, in the hollow inside of which a drive shaft 4 connected to the main drive of the vehicle is let through. The wheel hub 2 has an axle housing 5 rotatably arranged on the hollow spindle 3. Onto a flange 6 of the axle housing 5, a wheel rim of the wheel of the vehicle is detachably connected at a bore 7. The axle housing 5 is rotatable due to roller bearings 8, 9, with conical rollers, in this example. The inside of the wheel hub unit is sealed against the environment by a seal 10.

On an outer toothed surface 12 of hollow spindle 3, a ring gear support member 11 is engaged without rotation. Ring gear support member 11 is held in place by a disk 13 detachably fixed to hollow spindle 3 by screws 14.

Ring gear support member 11 inhouses a multi-plate friction type wet brake 15 of the wheel hub 2 unit; multi-plate friction type wet brake 15 has conventional construction as described e.g. in U.S. Pat. No. 5,088,967.

At the outer end of ring gear support member 11 being opposite to axle casing 1, a planetary gearing 16 of the wheel hub 2 is attached. A ring gear 17 of it is arranged as a torque trust but slightly disposable on this end of the ring gear support member 11. For this purpose, ring gear 17 having inner splines is attached to outer splines 18 formed on ring gear support member 11. On the inner splines of ring gear 17, planetary gears 19 are running and moving around a sun wheel 20 arranged at the end of drive shaft 4.

Returning now to multi-plate wet brake 15, inner brake plates 21 of it mesh with outer splines of a toothed sleeve 22 splined on drive shaft 4 whilst outer brake plates 23 mesh with inner splines provided on an inner ring surface in this region of the ring gear support member 11. The inner brake plates 21 and the outer brake plates 23 are arranged alternately within the multi-plate friction type wet brake 15 and lie against an annular thrust plate 24 prevented from radial displacement by the inner splines of the support member 11 and from axial displacement in direction opposite to the brake plates 21, 24 by a circlip 25 in support member 11.

Multi-plate friction type wet brake 15 has a brake piston 26 being displaceable in axial direction of the hub 2 upon the impact of a pressurised liquid introduced through bores 27. Brake piston 26 is formed as an annular piston moveably arranged in a stepped bore 28 of support member 11.

As is clear now, the multi-plate friction type wet brake 15 is circumferenced with all its parts by ring gear support member 11, thus, the operational brake 15 of the vehicle is arranged in its entirety within ring gear support member 11. This has beneficial effect on the constructional length, the smooth running of the geared connections and the stiffness of the whole assembly, also in case of extreme loads such as emergency braking of the vehicle.

Wheel hub 2, as in this invention, has a parking brake 29 as well. The parking brake 29 includes a piston 30 and a spring assembly. The spring assembly is formed in the embodiments of FIGS. 1 to 3 as a series of helical springs 31 arranged parallelly to each other and driving shaft 4 on a diameter exceeding the inner diameter of the piston 30 of the parking brake 29. Springs 31 are mounted in a pre-stressed status into parking brake 29, and they lie against piston 30 and support member 11.

Piston 30 has on its outer periphery a flange formed as a groove serving as a spring cup 32 receiving and supporting springs 31. The outer surface of spring cup 32 lies against brake piston 26. Piston 30 is also formed as an annular piston moveably arranged in axial direction. In its inner periphery, piston 30 has a radially inwardly extending flange 33 sealed against disk 13 (see FIG. 3) and disk 13 has a radially outwardly extending flange 34 sealed against piston 30. A pressure chamber 35 of brake 29 is defined in this way by flanges 33, 34 and the bodies of disk 13 and piston 30.

FIG. 2 shows piston 30 of parking brake 29 before being mounted into hub 2. Into annular spring cup 32 helical springs 31 are seated, and reference numeral 33 indicates the flange 33 of piston 30.

Figure 3:
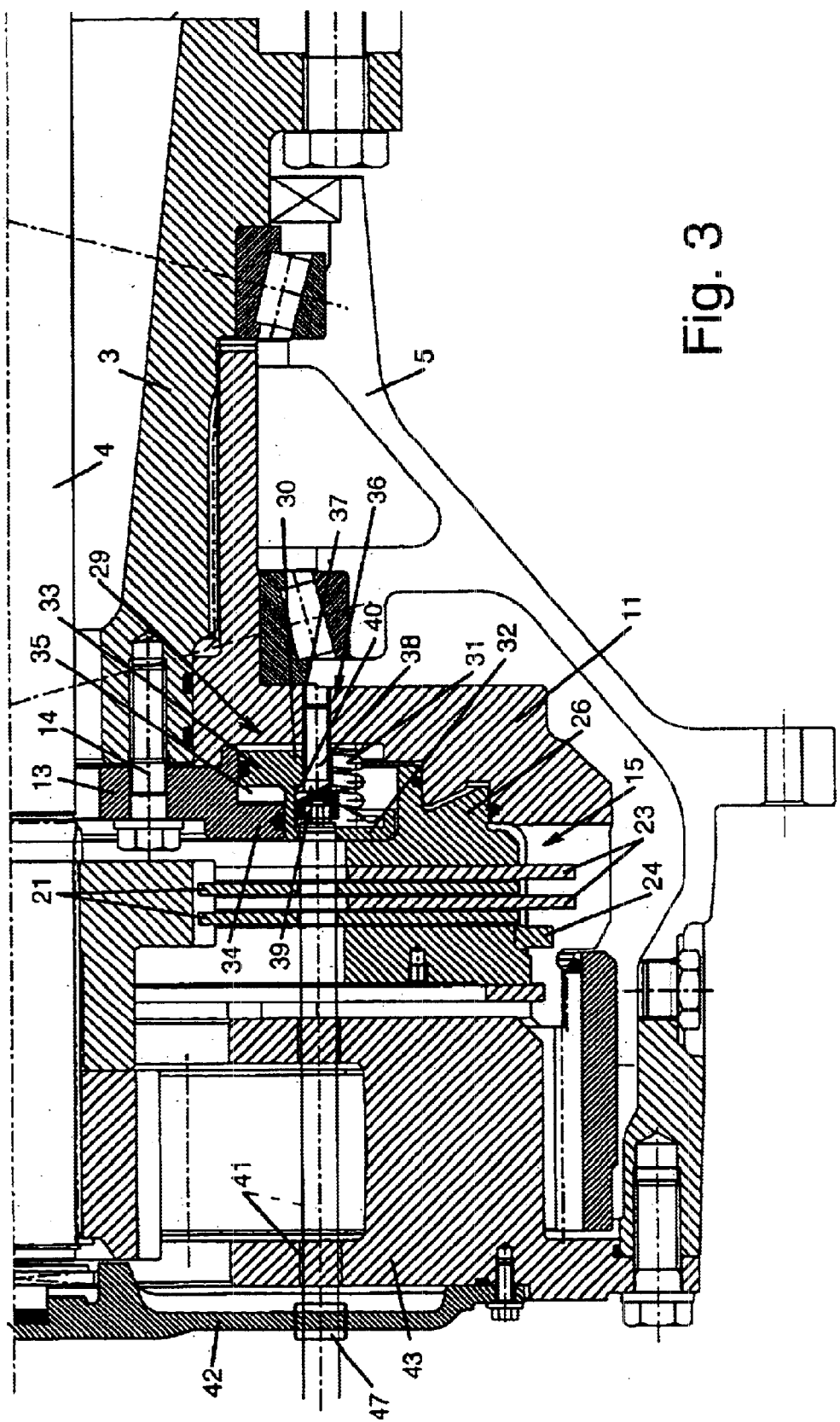
FIG. 3 is a portion of the cross sectional view in FIG. 1 in larger scale.

In sense of the invention, the wheel hub 2 has means 36 for manually de-activating said parking brake 29 from outside hub 2 (FIG. 1). As is shown in FIG. 3 in more detail, a threaded bore 37 is provided in ring gear support member 11 and therein, a screw 38 is arranged. A head 39 engages with a seat 40 (FIG. 2.) formed in piston 30 as a web. Co-axially to screw 38, a through-passage 41 is provided in form of a series of bores in an outer cover 42 of hub 2, a planetary carrier 43 of planetary gearing 16, inner brake plates 21 and piston 30, and through-passage 41 terminals onto screw head 39. The bore in cover 42 can be blanked by a screw not shown in the Figure to prevent exit of oil or other lubricant from within the hub 2.

Figure 4:
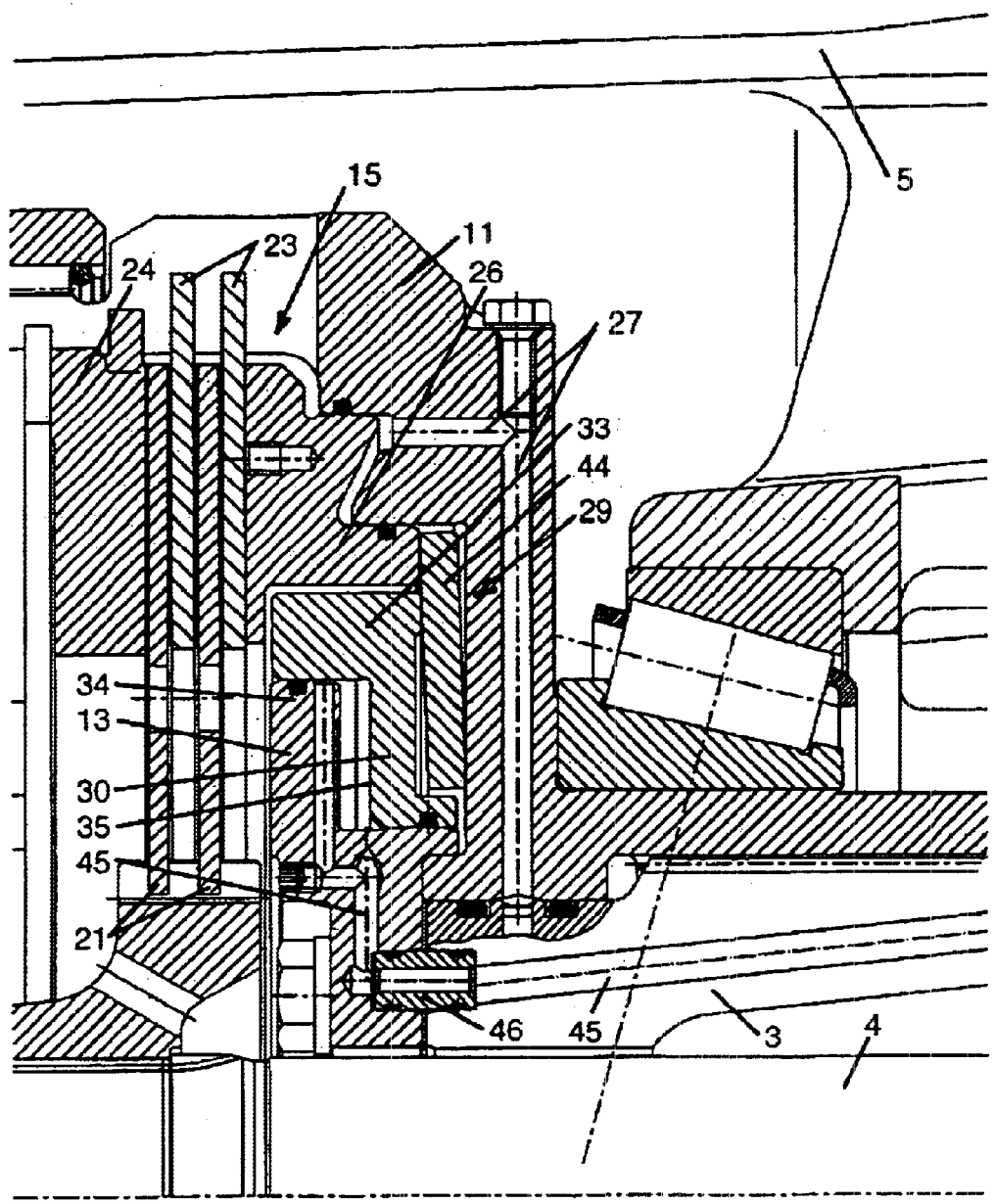
FIG. 4 shows a portion of the cross section of another embodiment.

FIG. 4 illustrates an embodiment of the wheel hub 2 as in this invention, wherein the spring assembly of the parking brake 29 has instead of helical springs 31 as in FIGS. 1 to 3, at least one annular cup spring 44 lying against brake piston 26 of multi-plate friction type wet brake 15 and/or piston 30 of parking brake 29, on one hand, and ring gear support member 11, on the other. Further details including the (not shown) means for manually de-activating the parking brake 29 are the same as described with FIGS. 1 to 3.

Figure 5:
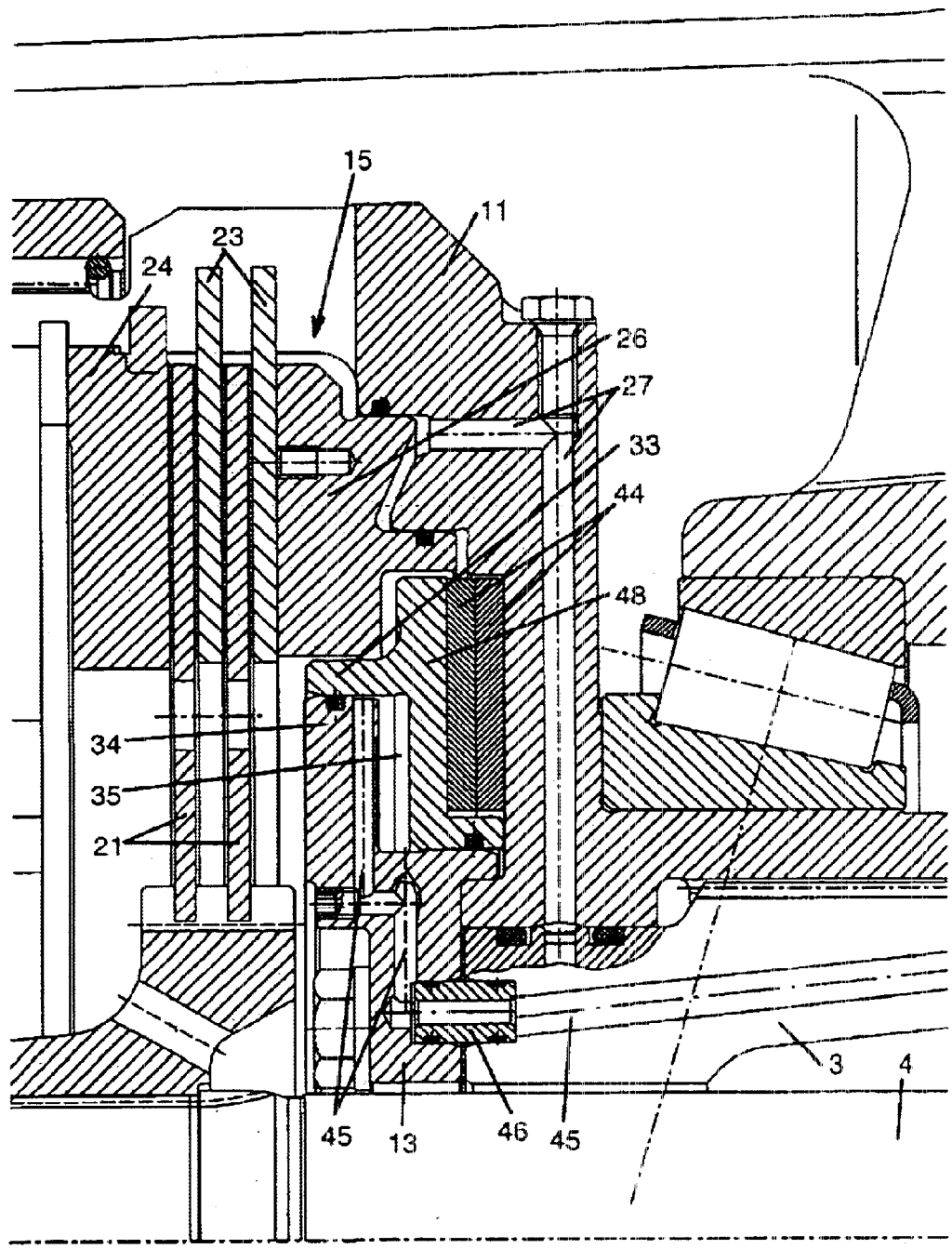
FIG. 5 shows a portion of the cross section of still another embodiment.

Referring now to FIG. 5, there are two annular cup springs 44 which both lie on piston 30 of parking brake 29 only. For this purpose, piston 30 has an extension 48 to enlarge the abutting surface for cup spring 44.

Pressurised liquid is introduced into pressure chamber 35 of piston 30 through bores 45 in disk 13 (FIGS. 4, 5) and hollow spindle 3 (FIG. 1). Between hollow spindle 3 and disk 13, bores 45 are interconnected by an intermediate pressure tube 46 having a middle through-bore. Pressure tube 46 is sealed against spindle 3 as well as disk 13 and is able to cope with the small displacements between spindle 3 and disk 13 due to distortions under load without leak of the pressurised liquid actuating piston 30.

In operation of the embodiments shown in the drawing, pressure chamber 35 is under pressure and thus, piston 30 is pressed against ring gear support member 11. Helical springs 31 in FIGS. 1 to 3 and cup spring 44 in FIG. 4 are in stressed position. As is shown in FIG. 5, piston 30 is moved away from brake piston 26, and it can slide against or from brake plates 21, 23 without constraint, in dependency of the amount of pressure in the pressure chamber between brake piston 26 and support member 11.

When the pressure is eliminated in pressure chamber 35, helical springs 31 or cup spring 44 urge piston 30 away from support member 11 towards brake piston 26 until spring cup 32 lies against the outer surface of brake piston 26, see FIG. 1. On the impact of piston 30, brake piston 26 will move against thrust plate 24 and thus, rotating brake plates 21 will be pressed on standing brake plates 23. The same effect is reached in the embodiment of FIG. 5 if there is no pressure of liquid in pressure chamber 35. The cup spring 44 in FIG. 4 however acts on brake piston 26 directly whilst it pushes piston 30 away, too. This will result in a braking action and the vehicle will be brought into a standstill if it moved before or is fixed in its standing, e.g. in parking position. As you will see for now, the parking brake 29 will operate irrespective the reason of seizing the pressure in chamber 35. Thus, it serves as an emergency brake as well.

If the vehicle or the pressurising system of the liquid to be introduced into chamber 35 for the purpose of de-activating the parking brake 29 are out of order, the parking brake can manually be de-activated from outside the wheel hub 2. For this, the screws (not shown) blanking the bore in cover 42 of hub 2 forming the inlet of through-passage 41 shall be moved into horizontal position to avoid leakage of the oil within hub 2 when the screws are removed. After removal of the screws, a screw wrench 47 can be introduced by through-passage 41 and through the bores in outer cover 42, planetary carrier 43, inner brake plates 21 and piston 30 into screw head 39. After engagement, screw 38 can be driven into threaded bore 37 until piston 30 lies against support member 11. With this, however, springs 31 or 44 will be stressed, and piston 30 leaves brake piston 26. Now, brake plates 21 and 23 can freely rotate in respect to each other and the braking action will seize. After this, screw wrench 47 will be removed, the screws blanking the bores in cover 42 newly put in place, and the vehicle can freely be moved as the case may require. After mending the failure, wrench 47 shall be engaged with screws 38 again and screws 38 shall be loosened by screw wrench 47 as described with above with the exception of not tightening but loosening the screws 38, and after removal the wrench 47, the hub 2 is normally operational again.

The most important advantage is apparent in the very simple construction of the arrangement as described. The invention, however, utilises all previous constructional solutions providing a well-known and reliable axle assembly of heavy duty vehicles. It is important, too, that neither the parking brake 29 nor the means 26 for manually de-activating the parking brake 29 require any extra space: outer measurements of the wheel hub 2 as in this invention will not change irrespective the fact that it contains parking brake 29 and means 26 for manually de-activating it as well. On the other hand, the solution as in this invention allows to auxiliary equip conventional wheel hubs with a parking brake 29 and/or means 26 for manually de-activating it. This is a quite important advantage when the operational security and the cost factors of heavy duty vehicles are considered.

What is claimed is:

1. A wheel hub for a vehicle having a built-in brake assembly for stopping and parking the vehicle, the hub comprising:

a hollow axle casing;

a hollow axle housing rotatably mounted on the axle casing;

a planetary gearing and a multi-plate friction wet brake that are coupled to a drive shaft of the vehicle, the multi-plate friction wet brake having inner brake plates, outer brake plates, an annular thrust plate, and a brake piston displaceable in an axial direction that are arranged in their entirety within a ring gear support member splined on a periphery of said axle casing without rotation; and a parking brake with a second piston and a spring assembly, wherein the second piston and the spring assembly are arranged within the ring gear support member, impact on the brake piston, and on the ring gear support member, wherein the parking brake has means for manually de-activating said parking brake from outside said hub, and wherein the second piston is an annular piston moveably arranged on an outer periphery of a disk holding the ring gear support member against the axle casing, the disk being fixed to the axle casing.

2. The wheel hub as claimed in claim 1, wherein a pressure chamber is between the second piston and the disk, and the second piston has a radially inwardly extending flange sealed against the disk and the disk has a radially outwardly extending flange sealed against the second piston.

3. A wheel hub for a vehicle having a built-in brake assembly for stopping and parking the vehicle, the hub comprising:

a hollow axle casing;

a hollow axle housing rotatably mounted on the axle casing;

a planetary gearing and a multi-plate friction wet brake that are coupled to a drive shaft of the vehicle, the multi-plate friction wet brake having inner brake plates, outer brake plates, an annular thrust plate, and a brake piston displaceable in an axial direction that are arranged in their entirety within a ring gear support member splined on a periphery of said axle casing without rotation; and a parking brake with a second piston and a spring assembly, wherein the second piston and the spring assembly are arranged within the ring gear support member, impact on the brake piston, and on the ring gear support member, wherein the parking brake has means for manually de-activating said parking brake from outside said hub, wherein the spring assembly has a series of helical springs arranged parallelly to each other and to the drive shaft on a diameter exceeding an inner diameter of the piston of the parking brake, and wherein the second piston has an annular groove serving as a spring cup receiving said helical springs, the spring cup lying with its outer surface against said brake piston.

4. A wheel hub for a vehicle having a built-in brake assembly for stopping and parking the vehicle, the hub comprising:

a hollow axle casing;

a hollow axle housing rotatably mounted on the axle casing;

a planetary gearing and a multi-plate friction wet brake that are coupled to a drive shaft of the vehicle, the multi-plate friction wet brake having inner brake plates, outer brake plates, an annular thrust plate, and a brake piston displaceable in an axial direction that are arranged in their entirety within a ring gear support member splined on a periphery of said axle casing without rotation; and a parking brake with a second piston and a spring assembly, wherein the second piston and the spring assembly are arranged within the ring gear support member, impact on the brake piston, and on the ring gear support member, wherein the parking brake has means for manually de-activating said parking brake from outside said hub, and wherein the spring assembly has at least one annular cup spring lying against said ring gear support member and at least one of the brake piston and said second piston.

5. A wheel hub for a vehicle having a built-in brake assembly for stopping and parking the vehicle, the hub comprising:

a hollow axle casing;

a hollow axle housing rotatably mounted on the axle casing;

a planetary gearing and a multi-plate friction wet brake that are coupled to a drive shaft of the vehicle, the multi-plate friction wet brake having inner brake plates, outer brake plates, an annular thrust plate, and a brake piston displaceable in an axial direction that are arranged in their entirety within a ring gear support member splined on a periphery of said axle casing without rotation; and a parking brake with a second piston and a spring assembly, wherein the second piston and the spring assembly are arranged within the ring gear support member, impact on the brake piston, and on the ring gear support member, wherein the parking brake has means for manually de-activating said parking brake from outside said hub, and wherein the means for manually de-activating said parking brake has means to urge said second piston against the ring gear support member.

6. A wheel hub for a vehicle having a built-in brake assembly for stopping and parking the vehicle, the hub comprising:

a hollow axle casing;

a hollow axle housing rotatably mounted on the axle casing;

a planetary gearing and a multi-plate friction wet brake that are coupled to a drive shaft of the vehicle, the multi-plate friction wet brake having inner brake plates, outer brake plates, an annular thrust plate, and a brake piston displaceable in an axial direction that are arranged in their entirety within a ring gear support member splined on a periphery of said axle casing without rotation; and a parking brake with a second piston and a spring assembly, wherein the second piston and the spring assembly are arranged within the ring gear support member, impact on the brake piston, and on the ring gear support member, and wherein the parking brake has means for manually de-activating said parking brake from outside said hub, wherein said means for manually deactivating includes at least one through-passage passing through the inner brake plates and the second piston and at least one screw in threaded connection with the ring gear support member coaxially with the through-passage, wherein a head of said at least one screw lies against a seat in said second piston to move the second piston towards the ring gear support member when the screw is screwed into the ring gear support member.

7. A wheel hub for a vehicle, comprising:

a multi-plate friction brake with brake plates and a brake piston that is movable against said brake plates to apply a braking force;

a parking brake with a movable second piston that is urged against said brake piston by a spring, a pressure chamber that urges said second piston away from said brake piston and overrides the urging of said spring when said pressure chamber is pressurized, and a manual release assembly that selectively overrides the urging of said spring when said pressure chamber is not pressurized, said manual release assembly including a seat on said second piston, a screw that engages said seat and pulls said second piston away from said brake piston when said screw is threaded into a receptacle, and a through-passage that extends from outside the wheel hub and through said second piston to said crew to permit access to said screw.

8. The wheel hub of claim 7, wherein said wheel hub further comprises a non-rotating ring gear support member, and wherein said receptacle is a threaded bore in said ring gear support member.

9. The wheel hub of claim 8, further comprising a disk that is arranged and structured to attach said ring gear support member to an axle housing of the vehicle, and wherein said second piston is on a radially outward periphery of said disk.

* * * * *